March 27, 1956 C. E. CREDE 2,739,774
SUPPORTING DEVICE

Filed Jan. 15, 1954 2 Sheets-Sheet 1

Inventor,
Charles E. Crede,
by Dike, Thompson & Sanborn
Attys.

March 27, 1956  C. E. CREDE  2,739,774
SUPPORTING DEVICE

Filed Jan. 15, 1954  2 Sheets-Sheet 2

Inventor,
Charles E. Crede,
by Dike, Thompson & Sanborn.
Attys.

United States Patent Office 2,739,774
Patented Mar. 27, 1956

2,739,774

SUPPORTING DEVICE

Charles E. Crede, Winchester, Mass., assignor to Barry Controls Incorporated, a corporation of Massachusetts Application January 15, 1954, Serial No. 404,306

6 Claims. (Cl. 248—24)

This invention relates to a device for supporting a supported member on a supporting member to reduce the transmission of vibration and movement from one member to the other. More particularly it relates to supporting devices adapted for use between the mounting feet of industrial machinery and the floors of industrial plants in which the machinery is used. Industrial machinery of the type referred to here includes punch presses, shears, lathes, grinders, forging hammers and similar machinery.

Some of the principal advantages derived from the provision of resilience in supporting devices for such machinery are:

1. The level of vibration and noise in the building resulting from the operation of such types of machinery is substantially reduced by mounting the machinery on resilient supporting devices.

2. Resilient supports function to isolate the mounted machine from vibration and shock resulting from vibration of other machinery or moving vehicles in the vicinity of the mounted machine and as a result the accuracy of operation of the mounted machine tends to be preserved and defects in the work are often prevented.

3. It is frequently unnecessary to bolt or otherwise secure the mounted machine to the floor and this saves the labor which is otherwise involved in bolting the machine to the floor and also avoids damage to the building which results from bolting the machinery to the floor.

4. The elimination of the need for bolting or otherwise securing the machinery to the floor renders the machinery relatively portable so that it can be arranged and rearranged to meet varying requirements of plant operation and so that each machine may be moved to the repair shop for maintenance and to the tool room for the installation and servicing of tools.

One object of my invention is to provide an improved resilient supporting device for supporting a supported member on a supporting member so that transmission of vibration from one member to the other is reduced and more particularly, to provide such an improved resilient device adapted for supporting industrial machinery.

A further object is to provide such a resilient supporting device with adequate stiffness for supporting the weight of typical industrial machinery.

A still further object is to provide a resilient supporting device which has appropriate horizontal stiffness to reduce the magnitude of horizontal forces applied to the mounting feet of the machinery, thereby preventing movement of the machinery over the floor even though the supporting device is not bolted to the floor.

Another object is to provide a resilient supporting device with a novel and efficient means for adjusting the height of that part of the machine which is supported so that the machine may be levelled or its operating height adjusted where required by installation or operating conditions. This eliminates the use of shims or wedges as means to level the machine for operation.

Another object of the invention is to provide a resilient supporting device for machinery of such design that the overall height of the supporting device is a minimum. Industrial machinery often is designed to be used without resilient supporting devices and the heights of the machines are selected for convenient use by the operator. Consequently, it becomes desirable that the height of the machine should be increased by a minimum as a result of installation of the resilient supporting devices.

Another object is to provide a resilient supporting device having an upper member or hood arranged to shed any oil or dirt that would otherwise be deposited from the mounted machine onto the resilient supporting device.

Other objects and advantages of my invention will be apparent from the following detailed description and appended drawings wherein three embodiments of the invention are illustrated.

Figure 1:
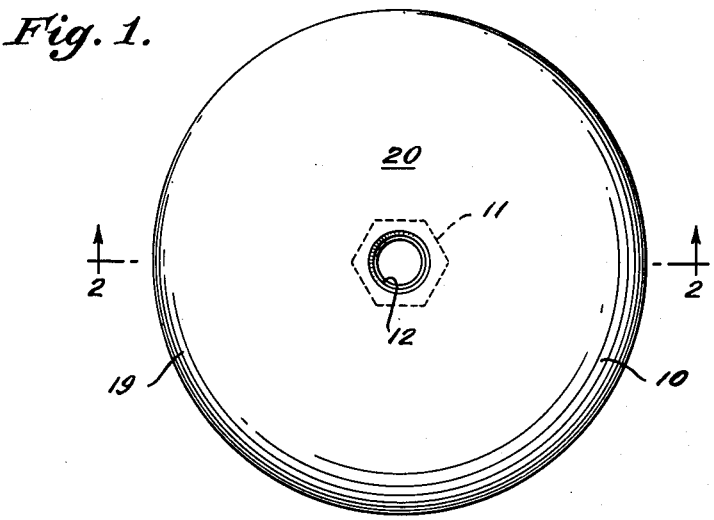
Fig. 1 is a top plan view of a resilient supporting device embodying the invention but with the height adjusting means removed.
Figure 2:
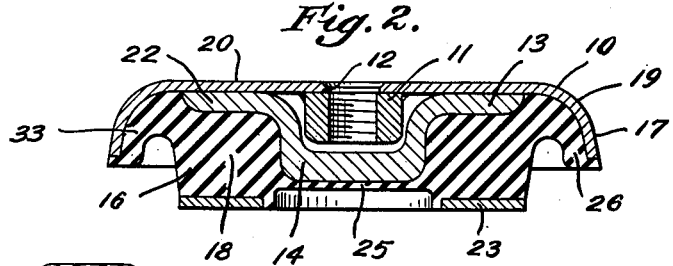
Fig. 2 is a section on line 2—2 of Fig. 1.
Figure 5:
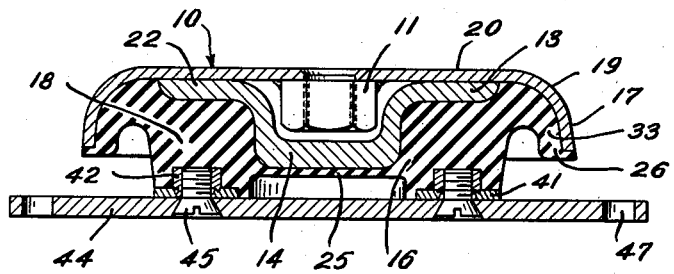
Figure 6:
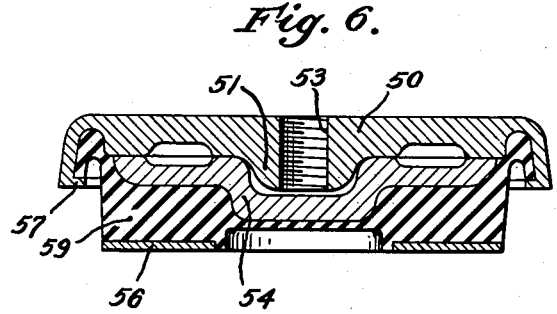

Fig. 5 is a vertical section similar to Fig. 2 but showing a different embodiment of the invention which has a base plate adapted for use in attaching the supporting device to the floor of a building; and Fig. 6 is a vertical section similar to Fig. 2 showing a further embodiment of the invention which has a modified form of upper metal member and alternate means for joining the resilient member to the upper metal member.

As illustrated in Figs. 1 to 4 inclusive, the supporting device includes an upper member in the form of an inverted cup 10 having an aperture 12 through the center thereof and a nut 11 welded to the underside of the cup concentric with its vertical center line and beneath the aperture. In the embodiment of the invention shown in Figs. 1 to 4 the supporting device is intended for use with relatively light machinery and the outer cup 10 is preferably drawn from sheet metal.

A rigid piece 13 having a diameter somewhat less than the diameter of the upper member or inverted cup 10 is located directly below the cup 10 with its vertical center line aligned with the vertical center line of the cup. The rigid piece 13 includes a depressed central portion 14 arranged to be free from engagement with the nut 11.

The resilient load supporting element 16 is preferably made from natural rubber or from a synthetic rubber such as Neoprene. It is preferably bonded to the underside of the rigid piece 13 and also to the depending outer part 17 of the inverted cup 10. Bonding is a process by which rubber is caused to adhere to metal and it is usually effected during vulcanization of the rubber. The resilient element 16 preferably is not bonded to the outer cup 10 in the region of the curved part 19 which connects the outer depending part 17 to the flat upper part 20 of the cup nor between the curved part 19 of the cup and the outer periphery of the upper surface of the rigid piece 13. The reason for leaving this interface unbonded will become apparent from the following description.

Figure 3:
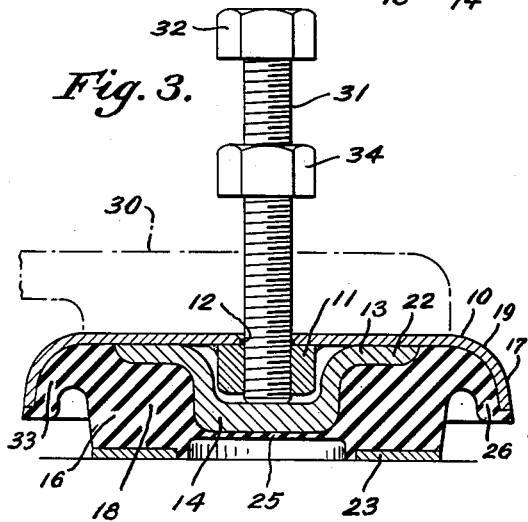
Fig. 3 is a view similar to Fig. 2 but illustrating one step of installing the resilient supporting device beneath one of the mounting feet of an industrial machine.
Figure 4:
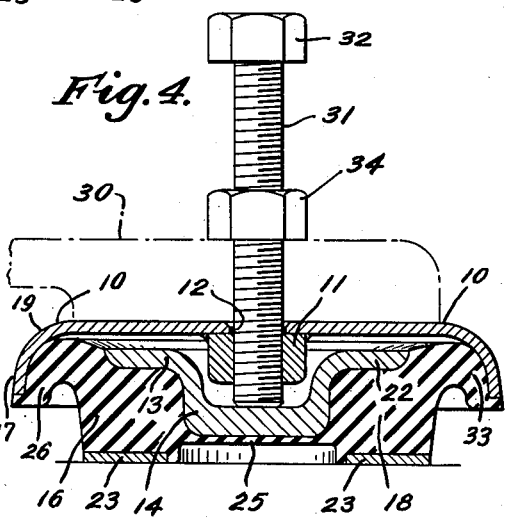
Fig. 4 is similar to Fig. 3 but shows the resilient supporting device completely installed and adjusted to increase the height of the mounting foot of the machine.

As illustrated most clearly in Figs. 2 and 3, the resilient element 16 is essentially an annular shaped member. When the supporting device is installed as shown in Fig. 4 the weight of the mounted machine is transmitted to the load supporting resilient element 16 principally by the outer or elevated portion or area 22 of the rigid piece.

13. The part 18 of the resilient element 16 which underlies the portion 22 of the rigid piece 13 and which is subjected to the weight of the mounted machinery thus has a thickness equal to the distance between the outer part 22 of the rigid piece 13 and the annular base plate 23. This makes it possible for the supporting device to experience a relatively great static deflection under the weight of the mounted equipment without exceeding the permissible unit strain in the resilient material. It should be noted that the portion of the resilient material 25 which is located beneath the depressed part 14 of the rigid piece 13 is not subjected to the dead-weight load of the mounted equipment. The outer part 26 of the resilient material likewise is not subjected to the stress resulting from the weight of the equipment.

The supporting device is installed by placing it underneath a mounting foot 30 of the machinery to be mounted as illustrated in Fig. 3. A bolt 31 is then inserted through the mounting hole in the foot 30 and threaded into the nut 11 which is welded to the underside of the outer cup 10 of the supporting device. If conditions are such as to require elevating one or more of the mounting feet of the machine, the bolt 31 is rotated by applying a wrench to the head 32. The bolt thus moves downwardly through the nut 11 and raises the outer cup 10 relative to the rigid piece 13. The outer cup is shown in an elevated position in Fig. 4. This elevates the mounting foot 30 of the machine with reference to the floor. The part 33 of the resilient element that extends between the depending part 17 of the outer cup and the relatively thick part 18 of the resilient element 16 is relatively thin, thereby permitting the supporting device to assume the configuration illustrated in Fig. 4. It is to be noted that the resilient element 16 is not bonded to the outer cup 10 in the area adjacent to the periphery of the rigid piece 13.

After each of the supporting devices has been adjusted to the position necessary to level the mounted machinery, the nut 34 is threaded downwardly on the bolt 31 until it engages the top surface of the mounting foot 30. When the nut has been tightened securely against the mounting foot, the adjustment of the supporting device becomes locked as illustrated in Fig. 4.

In many applications of the resilient supporting device described herein, it is not necessary to bolt the supporting device to the floor. The mounted machine remains fixed in position even though not bolted. This may be explained by pointing out that the resilient load-supporting element 16 functions in shear when subjected to horizontal forces, and that the stiffness of rubber in shear is relatively low. Consequently, the mounted machine is permitted to move freely in response to such horizontal forces and the resilient supporting device does not transmit a sufficiently large horizontal force to overcome the friction between the lower face of the supporting device and the floor of the industrial plant. Consequently, there is no tendency of the machine to walk on the floor.

In occasional circumstances, the machine mounted upon resilient supporting devices may develop excessively large horizontal forces resulting from particular circumstances in the operation of the machine. The excessive motion of the mounted machine in response to such forces may deflect the resilient elements sufficiently to cause the horizontal force to overcome the friction between the lower faces of the supporting devices and the floor. If this occurs, it is necessary to bolt the supporting devices to the floor to keep the machine fixed in position. Means adapted for use in bolting a supporting device to the floor are illsutrated in Fig. 5. In this embodiment, the annular base plate 41 of the resilient supporting device is provided with tapped inserts 42 and these inserts are secured to the upper face of the base plate 41. These inserts are attached before the base plate is incorporated into the supporting device during vulcanization of the resilient element. A mounting plate 44 is attached to the base plate 41 by flat-head screws 45 or other suitable attaching means after vulcanization is complete. The mounting plate 44 is preferably provided with holes 47 for use in bolting the resilient supporting device to the floor of the industrial plant. While the bolt 31 and nut 34 are not shown in Fig. 5, they are intended to be used with this embodiment as well as with the embodiment of Figs. 1 to 4 inclusive.

Fig. 6 illustrates an embodiment of the invention intended for the mounting of relatively heavy machinery. The inverted cup 50 is in the form of a cast member having an integrally formed central boss 51. This central boss 51 is provided with threads 53 to accommodate the mounting and adjusting bolt 31 as illustrated in Fig. 3. The rigid piece 54 and base plate 56 of the embodiment shown in Fig. 6 are similar to the rigid piece 13 and base plate 23, respectively, illustrated in Fig. 2.

In making the embodiment of Figs. 1 to 4 inclusive, ordinarily the bonding or adhering of the rubber to the metal is effected during the vulcanization process and it requires that the metal parts be placed in a mold in which the rubber parts are formed. This necessitates the handling of very heavy metal parts during molding when the outer member is a casting such as is illustrated in Fig. 6. To eliminate such handling, the inverted cup 50 is provided with the inwardly turned lip 57 which retains the resilient element 59 in the required position without the need for bonding between the resilient element and the inverted cup 50 as disclosed in the other embodiments.

Although I have disclosed my novel supporting device as used with industrial machinery, it is not limited to such use but may be used to provide a yielding support between any two relatively movable members for the purpose of preventing the transmission of vibration from one member to the other.

While I have shown and described three embodiments of the invention, it is to be understood that this disclosure is for the purpose of illustration and that various changes in shape, proportion and arrangement of parts and the substitution of equivalent elements may be made without departing from the spirit or scope of the invention as set forth in the appended claims.

I claim:

1. A supporting device comprising a substantially rigid, inverted, cup-shaped member having a top wall and a depending side wall, a resilient load supporting element of rubber-like material disposed beneath said cup-shaped member and comprising a relatively thick central portion having a relatively thin flange extending outwardly and downwardly from the upper part thereof, said flange being attached to said depending side wall, a substantially rigid piece interposed between said top wall and said central portion of said resilient element, said rigid piece having a depressed central portion extending downwardly into a cavity in said central portion, said cup-shaped member having a projection extending downwardly into said depressed portion of said rigid piece, the upper surface of said rigid piece and the portion of the upper surface of said resilient element which is adjacent to said upper surface of said rigid piece being free from attachment to and movable with respect to said cup-shaped member, the lower surface of said rigid piece having substantially the same contour as the adjacent surface of said resilient element and means for moving said cup-shaped member upwardly relative to the bottom of said resilient element, said last mentioned means comprising a threaded member extending through said projection and engaging said rigid piece, the stiffnesses of said relatively thick central portion and said outwardly extending flange of said resilient element cooperating with said rigid piece to cause said cup-shaped member to move upwardly a substantial distance relative to the bottom of said resilient element when said threaded member is screwed downwardly to adjustably separate said rigid piece and said cup-shaped member.

2. A supporting device adapted to be used with a plurality of similar supporting devices to support an object upon and to level it with respect to a floor, said supporting device comprising a substantially rigid upper member, a rigid piece having a depressed central portion forming an upwardly facing cavity having an upstanding wall, said rigid piece having a portion extending laterally outwardly from said upstanding wall, said laterally extending portion underlying said upper member in face-to-face relationship, a depending embossment integral with said upper member and including a substantially vertical internally threaded passage, means for adjustably moving said upper member upwardly from said rigid piece comprising an exteriorly threaded bolt extending through said passage and engaging said depressed portion, a substantial portion of said embossment being located within said cavity when the upper member is in its lowermost position relative to said rigid piece and prior to movement of said upper member upwardly from said rigid piece by turning of said bolt; said cavity being at least as deep as the portion of the vertical height of said embossment received therein, and a resilient element comprising a load supporting portion at least the major portion of which extends from the laterally extending portion of said rigid piece substantially to the bottom of the supporting device, said load supporting portion of the resilient element having an opening the wall of which is adjacent to and surrounds said upstanding wall.

3. A supporting device adapted to be used with a plurality of similar supporting devices to support an object upon and to level it with respect to a floor, said supporting device comprising a substantially rigid upper member having a central portion and an outer portion, a substantially rigid piece disposed below said central portion of said upper member, a resilient element having a central portion and an outer portion, at least the major portion of said central portion of the resilient element being disposed below said rigid piece in substantially face-to-face relationship therewith, extending therefrom substantially to the bottom of the supporting device and constituting substantially the sole load supporting portion of said resilient element, said outer portion of the resilient element extending outwardly from said central load supporting portion, being attached to the outer portion of said upper member outwardly of said central portion of the resilient element and its lower surface being free from attachment to any element of the supporting device, and adjustment means engaging said rigid piece and said upper member for moving said upper member upwardly relative to said rigid piece, whereby the lower surface of said outwardly extending portion of the resilient element is free to be moved upwardly by the upper member while the lower surface of the central portion of the resilient element is held stationary by the weight of a load applied to said upper member.

4. A supporting device according to claim 3 wherein said outwardly extending portion of the resilient element is thinner than said central load supporting portion thereof.

5. A device according to claim 2 wherein said major portion of the resilient element constitutes substantially the sole load supporting portion of the resilient element and said resilient element also comprises a portion extending outwardly from said load supporting portion, attached to an outer portion of the upper member outwardly of said load supporting portion and having its lower surface free from attachment to any element of the supporting device, whereby the lower surface of said outwardly extending portion of the resilient element is free to be moved upwardly by the upper member while the lower surface of said major portion of the resilient element is held stationary by the weight of a load applied to said upper member.

6. A device according to claim 2 wherein said major portion of the resilient element comprises a relatively thick load supporting portion and a relatively thin portion extending outwardly from said thick portion, said outwardly extending portion being attached outwardly of said load supporting portion to an outer portion of said upper member and free from load supporting compression.

References Cited in the file of this patent

UNITED STATES PATENTS 2,642,252  Pietz _____ June 16, 1953

FOREIGN PATENTS 54,427  France _____ Oct. 24, 1949
(Addition to No. 905,631)
406,208  Italy _____ Oct. 23, 1943
735,557  Germany _____ May 22, 1943